US007693522B2

(12) United States Patent
Bichot et al.

(10) Patent No.: US 7,693,522 B2
(45) Date of Patent: Apr. 6, 2010

(54) METHOD AND APPARATUS FOR HANDING OFF A MOBILE TERMINAL BETWEEN A MOBILE NETWORK AND A WIRELESS LAN

(75) Inventors: Guillaume Bichot, Princeton, NJ (US); John Richardson, Hamilton Square, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 739 days.

(21) Appl. No.: 10/499,541

(22) PCT Filed: Dec. 10, 2002

(86) PCT No.: PCT/US02/39435

§ 371 (c)(1),
(2), (4) Date: Jun. 21, 2004

(87) PCT Pub. No.: WO03/054721

PCT Pub. Date: Jul. 3, 2003

(65) Prior Publication Data

US 2005/0021586 A1    Jan. 27, 2005

Related U.S. Application Data

(60) Provisional application No. 60/341,964, filed on Dec. 19, 2001.

(51) Int. Cl.
*H04W 36/00* (2009.01)
(52) U.S. Cl. ............... 455/442; 455/436; 455/445; 370/331; 370/338
(58) Field of Classification Search ......... 455/442–444, 455/436–437, 445, 440, 422.1, 456.2, 552.1, 455/41.2; 370/331–333, 328, 338; 709/228–229
See application file for complete search history.

(56) References Cited

U.S. PATENT DOCUMENTS 4,811,380 A * 3/1989 Spear ................. 455/437

(Continued)

FOREIGN PATENT DOCUMENTS

EP    0719064 A2    6/1996

(Continued)

OTHER PUBLICATIONS

Search Report Dated Mar. 18, 2003.

(Continued)

*Primary Examiner*—Sharad Rampuria
(74) *Attorney, Agent, or Firm*—Robert D. Shedd; Joseph J. Opalach; Jerome G. Schaefer

(57) ABSTRACT

A method for performing a handover of a mobile terminal between a 3G cell and a WLAN cell when the mobile terminal moves within a 3G cell into the coverage area of the WLAN cell. The present invention proposes that the handover be performed when there are no active calls. If there are ongoing calls, method proposes to wait until the calls are terminated before the handover is performed. After the ongoing calls are terminated, the handover is performed by disassociating from the radio access network of the 3G cell and associating with the access point of the WLAN, using the relatively straightforward disassociation and association procedures. The handover method according to the present invention obviates the need for complex and expensive protocols to ensure a seamless and error free handover of calls when moving from the coverage of the 3G cell to the coverage of the WLAN cell. This method can be used with either the loose coupling arrangement or the tight coupling arrangement.

18 Claims, 3 Drawing Sheets

U.S. PATENT DOCUMENTS

| | | | |
|---|---|---|---|
| 5,101,501 A * | 3/1992 | Gilhousen et al. | 455/442 |
| 5,127,042 A * | 6/1992 | Gillig et al. | 455/552.1 |
| 5,444,766 A * | 8/1995 | Farwell et al. | 455/437 |
| 5,664,007 A * | 9/1997 | Samadi et al. | 455/442 |
| 5,920,818 A * | 7/1999 | Frodigh et al. | 455/443 |
| 6,026,301 A * | 2/2000 | Satarasinghe | 455/436 |
| 6,061,337 A * | 5/2000 | Light et al. | 370/331 |
| 6,073,021 A * | 6/2000 | Kumar et al. | 455/442 |
| 6,075,990 A * | 6/2000 | Shin | 455/440 |
| 6,097,954 A * | 8/2000 | Kumar et al. | 455/442 |
| 6,104,929 A * | 8/2000 | Josse et al. | 455/445 |
| 6,115,608 A * | 9/2000 | Duran et al. | 455/436 |
| 6,122,263 A * | 9/2000 | Dahlin et al. | 370/329 |
| 6,192,239 B1 | 2/2001 | Lee et al. | |
| 6,212,384 B1 | 4/2001 | Almgren et al. | |
| 6,216,003 B1 | 4/2001 | Hamajima et al. | |
| 6,243,581 B1 * | 6/2001 | Jawanda | 455/432.2 |
| 6,324,406 B1 * | 11/2001 | Zadeh | 455/456.2 |
| 6,360,098 B1 * | 3/2002 | Ganesh et al. | 455/436 |
| 6,393,287 B1 * | 5/2002 | Munekata et al. | 455/442 |
| 6,404,754 B1 | 6/2002 | Lim | |
| 6,424,833 B1 * | 7/2002 | Iizuka et al. | 455/436 |
| 6,553,232 B1 * | 4/2003 | Shaffer et al. | 455/440 |
| 6,594,242 B1 * | 7/2003 | Kransmo | 370/331 |
| 6,597,679 B1 * | 7/2003 | Willars | 370/342 |
| 6,725,044 B2 * | 4/2004 | Verma et al. | 455/444 |
| 6,763,233 B2 * | 7/2004 | Bharatia | 455/433 |
| 6,836,471 B2 * | 12/2004 | Holma et al. | 370/331 |
| 6,907,243 B1 * | 6/2005 | Patel | 455/442 |
| 6,931,249 B2 * | 8/2005 | Fors et al. | 455/436 |
| 7,035,241 B2 * | 4/2006 | Struhsaker | 370/338 |
| 7,039,027 B2 * | 5/2006 | Bridgelall | 370/329 |
| 7,046,646 B2 * | 5/2006 | Kilgore | 370/331 |
| 7,082,301 B2 * | 7/2006 | Jagadeesan et al. | 455/436 |
| 7,116,970 B2 * | 10/2006 | Brusilovsky et al. | 455/411 |
| 7,260,399 B1 * | 8/2007 | Oh et al. | 370/331 |
| 7,272,123 B2 * | 9/2007 | Wall | 370/331 |
| 7,295,540 B2 * | 11/2007 | Joong et al. | 370/338 |
| 7,319,871 B2 * | 1/2008 | Sliva | 455/436 |
| 7,366,513 B2 * | 4/2008 | Segal et al. | 455/436 |
| 7,502,615 B2 * | 3/2009 | Wilhoite et al. | 455/442 |
| 7,529,208 B2 * | 5/2009 | Choi et al. | 370/331 |
| 2002/0075844 A1 | 6/2002 | Hagen | |
| 2002/0107026 A1 | 8/2002 | Agrawal et al. | |
| 2002/0147008 A1 * | 10/2002 | Kallio | 455/426 |
| 2002/0167965 A1 | 11/2002 | Beasley et al. | |
| 2003/0005407 A1 | 1/2003 | Hines | |
| 2003/0014367 A1 | 1/2003 | Tubinis | |
| 2003/0031160 A1 | 2/2003 | Gibson Ang et al. | |
| 2003/0036387 A1 * | 2/2003 | Kovacs et al. | 455/442 |
| 2003/0114158 A1 * | 6/2003 | Soderbacka et al. | 455/436 |
| 2003/0193911 A1 * | 10/2003 | Zhao et al. | 370/331 |
| 2004/0090937 A1 * | 5/2004 | Chaskar et al. | 370/331 |
| 2004/0214574 A1 * | 10/2004 | Eyuboglu et al. | 455/439 |
| 2008/0220781 A1 * | 9/2008 | Karia et al. | 455/436 |
| 2009/0023450 A1 * | 1/2009 | George et al. | 455/442 |

FOREIGN PATENT DOCUMENTS

| | | |
|---|---|---|
| EP | 0883319 A2 | 12/1998 |
| JP | 10336719 | 12/1998 |
| JP | 11289278 A | 10/1999 |
| JP | 2001224050 A | 8/2001 |
| JP | 2002539688 | 11/2002 |
| WO | 0054523 A1 | 9/2000 |

OTHER PUBLICATIONS

ETSI TR 101 957, European Telecommunications Standards Institute, Aug. 2001, V1.1.1, pp. 28-29.

Broadband Radio Access Networks (BRAN); Hiperlan Type 2; Requirements and Architectures for Interworking between HIPERLAN/2 and 3$^{rd}$ Generation Cellular systems. ETSI TR 101 957 V1.1.1 (Jun. 2001) Sophia Antipolis Cedex- France.

* cited by examiner

METHOD AND APPARATUS FOR HANDING OFF A MOBILE TERMINAL BETWEEN A MOBILE NETWORK AND A WIRELESS LAN

This application claims the benefit, under 35 U.S.C. §365 of International Application PCT/US02/39435, filed Dec. 10, 2002, which was published in accordance with PCT Article 21(2) on Jul. 3, 2003 in English and which claims the benefit of U.S. provisional patent application No. 60/341,964, filed Dec. 19, 2001.

The present invention relates to an apparatus and a method for handing off a mobile terminal between radio access networks, and in particular between a mobile network and a wireless LAN.

BACKGROUND OF THE INVENTION

Recently, wireless LAN technologies, such as IEEE 802.11 or ETSI Hiperlan 2, have been developed that may be used in conjunction with existing networks, including mobile networks, i.e., 3G or 2G, to provide new high speed services, for example video streaming. The wireless LAN services provide the advantages of faster data speeds, generally on the order of about ten times faster than those provided by a 3G network, but are much more limited in the area of coverage and the number of users that can be connected to the base station. It is envisioned that a mobile terminal user would transition from a mobile telephony network to a wireless LAN upon entering a coverage area of the wireless LAN, and transition to the mobile telephony network upon leaving the coverage area of the wireless LAN.

A mobile network is essentially made up of a radio access network and a core network. A mobile terminal has a relationship with the core network through the radio access network. That is, a mobile terminal needs to be connected to the radio access network in order to communicate with the core network. The wireless LAN overlay uses a wireless LAN technology, such as ETSI Hiperlan 2 or IEEE 802.11, as the radio access network. The wireless LAN technology is generally more powerful than the mobile radio access network with regards to the available bandwidth. The wireless LAN is generally intended to cover a hot spot area, for example, an airport, where the number of potential users may be important. An issue faced in a system comprising a mobile network having one or more wireless LAN disposed therein is the management of the handoff as a mobile terminal moves between a 3G cell and a wireless LAN area.

Consider the case when a mobile terminal enters the coverage area of a wireless LAN that exists within the coverage area of a radio access network of a mobile network. The mobile terminal is currently attached to the radio access network. The wireless LAN may be detected using various detection methods known in the art. Once the wireless LAN has been detected, a handoff procedure must be performed to transition the mobile device from the access network of the mobile network to the wireless LAN. The handoff procedure may be complicated depending on the type of connection the mobile device has with the core network, i.e., circuit switching connection, a packet switching connection, or both. A good handoff procedure avoids data loss as much as possible during the switch between the two access networks. For the packet switching domain, it is possible, during handoff to buffer the packets. However, such buffering may introduce delay and does not guarantee zero loss of data. For the circuit switching domain, the process is more delicate due to the conversational nature of the connection that must be guaranteed. In any event, handing off the mobile terminal from one access network to another during an on going call may require the use of a complex and expensive protocol to ensure a seamless transfer.

Therefore, there is a need for a handoff strategy that does not require a complex and expensive protocol to implement and minimizes the potential for data loss.

BRIEF SUMMARY OF THE INVENTION

In accordance with the principles of the present invention, there is provided an apparatus and a method for handing off a mobile terminal between a first access network and a second access network in a manner that reduces the potential of data loss in ongoing calls, and does not require a complex and expensive protocol to implement. In particular, the present invention proposes a method for handing off the mobile terminal between an access network associated with a mobile network and a wireless LAN, wherein the wireless LAN coverage area is provided within the radio access network of the mobile network.

According to the present invention, rather than performing a handover when the new access network is detected, the handover is performed after it is determined that there are no active calls. If there is an active call in progress, the present invention proposes to wait until the call is terminated before handing off the mobile terminal to the new access network, i.e., the wireless LAN. Since the wireless LAN is disposed within the mobile access network, namely a 3G cell, there is no interruption in service while the system waits to handoff the mobile terminal to the access point of the wireless LAN. The handoff comprises the process of disassociating the mobile terminal from the 3G cell and then associating the mobile terminal with the access point of the wireless LAN. Alternatively, the handoff may be accomplished by transferring the attachment via the core network. Since the handoff occurs when all active calls are terminated, the present invention eliminates the need for complex and expensive protocols to transfer data and parameters associated with the ongoing calls, and also eliminates the potential of losing data during the ongoing call.

BRIEF DESCRIPTION OF THE DRAWINGS

The invention is described with reference to the figures, wherein.

DETAILED DESCRIPTION

The present invention provides an apparatus and a method for implementing a handoff procedure that reduces the potential for data loss and does not require a complex and expensive protocol to implement. The present handoff procedure determines whether the mobile terminal has any active calls, or connections, with a core network through a first access network, and if so, waits until the active calls, or connections, are terminated before proceeding with the handoff to the new access network. During an active call dedicated radio channel(s) is/are used in order to carry data between the mobile terminal and the network. The present invention is suitable for use in handing off a mobile terminal between a radio access network associated with a mobile network and a wireless LAN that exists within the coverage area of the radio access network.

Figure 1:
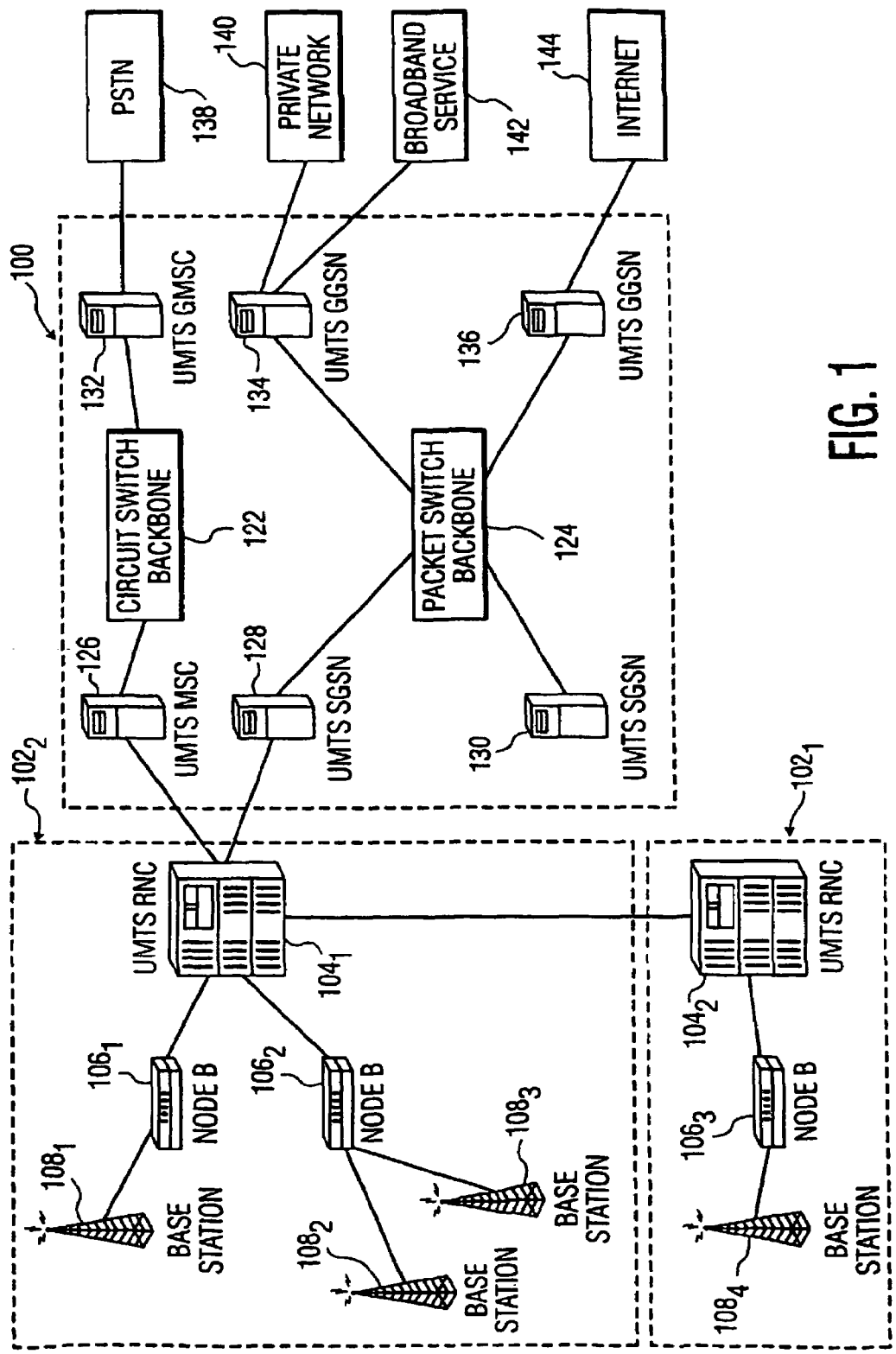
FIG. 1 illustrates a block schematic diagram of a mobile network.

FIG. 1 depicts a block schematic diagram of a mobile network, in particular, a 3G Universal Mobile Telecommunications System ("UMTS") network, suitable for use in the present invention. 3G network 100 comprises radio access networks $102_{1-2}$ coupled to core network 120. A radio access network is formed by a radio network controller (RNC) $104_{1-2}$, nodes B $106_{1-2}$ and base stations $108_{1-4}$. Each RNC controls one or more nodes B, and each node B controls one or several base stations 108. The RNC provides centralized control for the elements in the access network. The RNC includes an entity called the Radio Resource Controller (RRC) that controls the radio resource allocation within the radio access network. The RRC also manages the handoff procedure between two different radio access network technologies. A Node B is the physical unit for radio transmission/reception with the cells. Depending on sectoring, one or more cells may be served by a node B. Each base station essentially comprises a transceiver station and a control unit.

Each RNC $104_{1-2}$ is attached to the core network through serving GPRS Support Node (SGSN) 128 for packet switch data, e.g., internet data, and through Mobile Switching Center (MSC) 126 for circuit switched data, e.g. voice. One SGSN 128 may be associated with one or several RNCs. Several SGSNs and MSCs may be included in the core network.

The core network is comprised of two backbone networks, namely circuit switch backbone 122 and packet switch backbone 124. The packet switch backbone 124 interconnects the SGSNs with the gateway GPRS support nodes (GGSNs) 136, which interconnect the core network with other packet based networks, such as a corporate network or the internet. The circuit switch backbone 122 interconnects the MSCs with gateway MSCs (GMSCs), which interconnect the core network with other circuit switch based networks, such as ISDN or PTSN. The core network may include several GGSNs and GMSCs.

Figure 2:
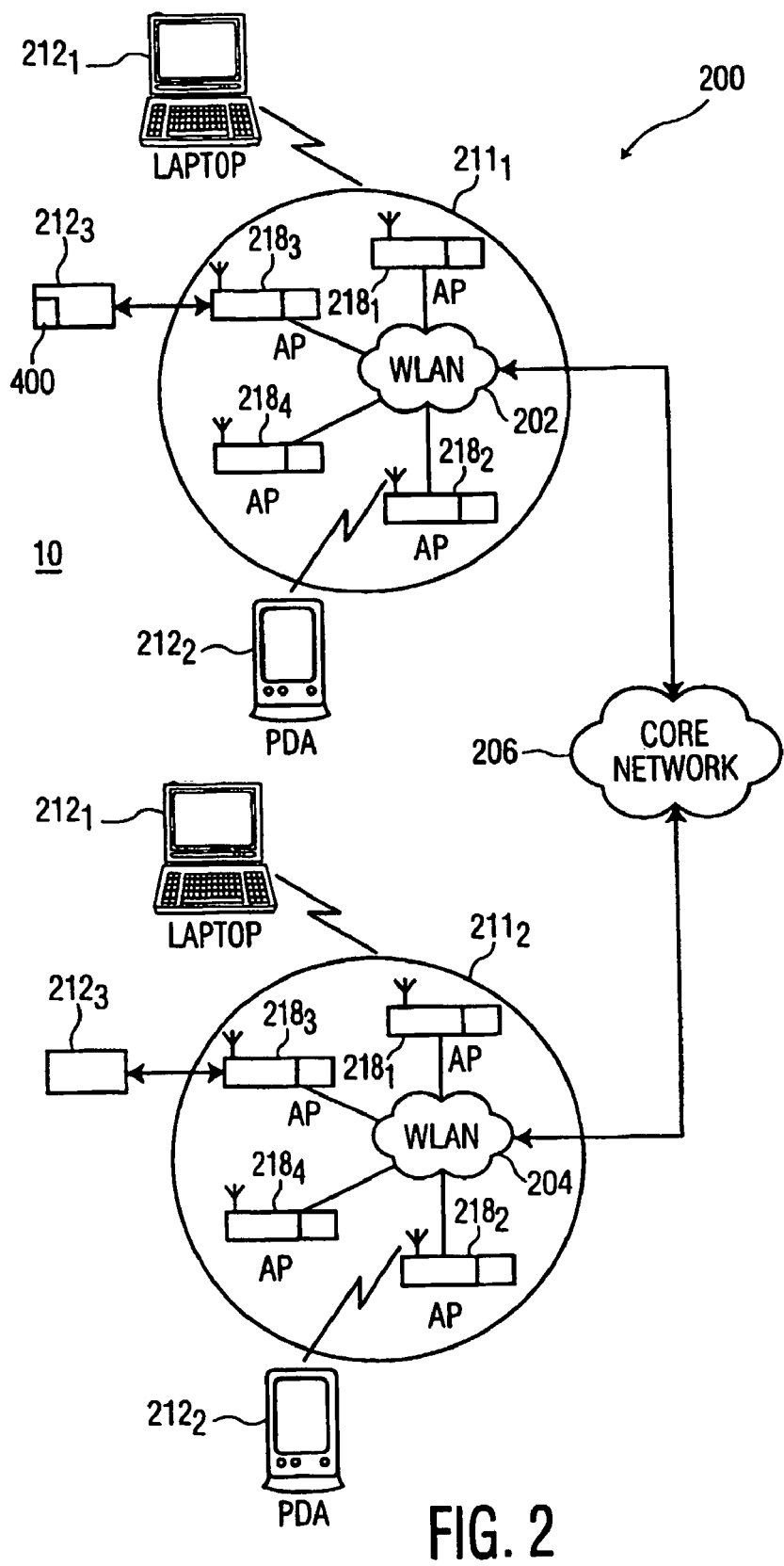
FIG. 2 illustrates a block schematic diagram of a wireless LAN.

FIG. 2 illustrates a block schematic diagram of a system 200 including wireless LAN 202 that includes a radio access network $211_1$. The radio access network $211_1$ enables at least one mobile terminal user, and preferably a plurality of users (e.g., users $212_1$, $212_2$, and $212_3$) to access an external data network 206, which may be, for example, the core network shown in FIG. 1. In a preferred embodiment, each user $212_1$ utilizes a lap top computer to access the network $211_1$ while each user $212_2$ utilizes a Personal Data Assistant and each user $212_3$ utilizes a wireless communications appliance such as wireless telephone. Other users can utilize other types of communications appliances.

The radio access network $211_1$ includes at least one, and preferably, a plurality of access points (APs), illustratively illustrated by APs $218_1$-$218_4$, via which each of the mobile terminal users $212_1$, $212_2$ and $212_3$ accesses wireless LAN 202. In the illustrated embodiment, each AP, such as AP $218_1$, includes a wireless transceiver (not shown) for exchanging radio frequency signals with a radio transceiver (not shown) within the communications appliance employed by each user. Each of the APs $218_1$-$218_4$ in the radio access network $211_1$ employs at least one well-known wireless data exchange protocol such as, IEEE 802.11b or the Hiperlan 2 radio interface standard. The WLAN 202 also includes a gateway (not shown) that provides the WLAN 202 with access to the external network 206.

Figure 3:
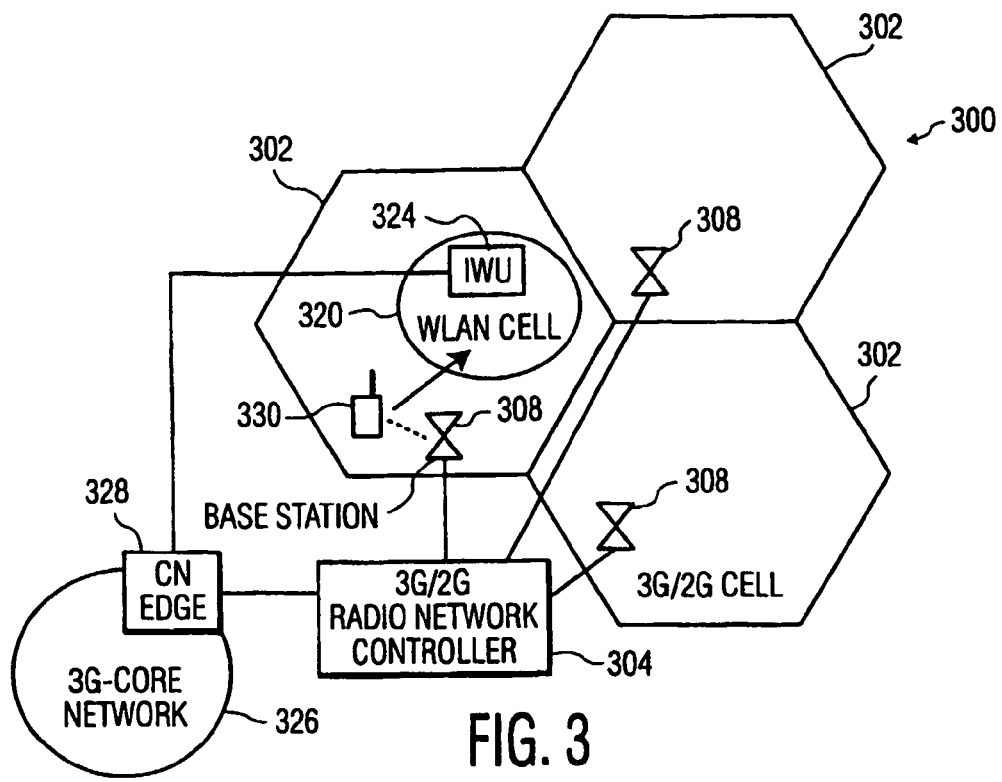
FIG. 3 illustrates a block schematic diagram of a system comprising a wireless LAN disposed within a mobile network in a loose coupling arrangement, which is suitable for use with the present invention.

FIG. 3 illustrates a block schematic diagram of a system 300 comprising wireless LAN and 3G cell infrastructures, which system is suitable for use with the present invention. The inter-working between the WLAN 320 and the 3G network is said to be in a tight coupling arrangement because the WLAN is directly connected to the 3G network according to the following. In accordance with the description above, the mobile network is made up of a set of radio cells 302. Each cell 302 is controlled by one base station 308. RNC 304 controls a set of base stations 308. Wireless LAN 320 provides coverage within one of the cells 302. The wireless LAN 320 may be used in hot spots, such as hotels or airports, to provide high speed access within those areas. Within wireless LAN 320 an access point, or a collection of access points (not shown), provides the access network functions to provide connectivity to core network 326. Also, within wireless LAN 320, inter working unit 324 provides gateway functions that may correspond to that provided by a RNC. Inter working unit 324 is connected to core network 326 via CN edge device 328, which also couples RNC 304 to core network 326. Mobile terminal 330 may be connected to core network 326 via 3G cell 302, or via WLAN cell 320 when the mobile terminal is inside WLAN cell 320.

Figure 4:
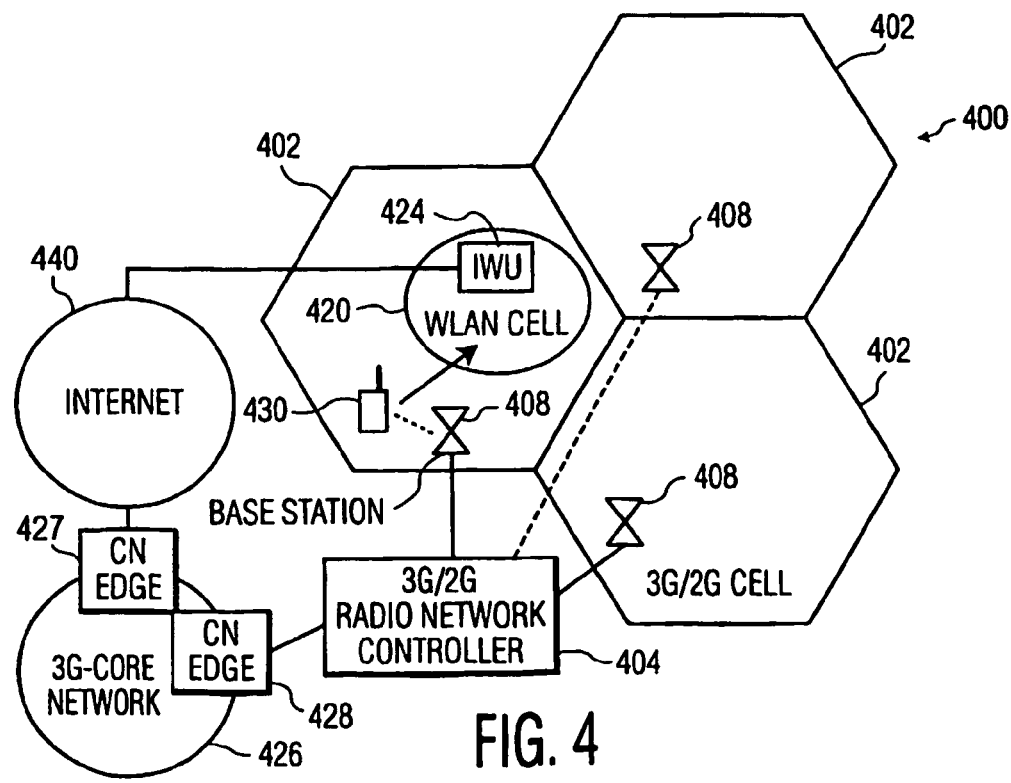
FIG. 4 illustrates a block schematic diagram of a system comprising a wireless LAN disposed within a mobile network in a tight coupling arrangement, which is suitable for use with the present invention.

FIG. 4 illustrates a block schematic diagram of a system 400 comprising wireless LAN cell 420 and 3G cells 402, which system is suitable for use with the present invention. The inter-working between the WLAN cell 420 and the 3G network of FIG. 4 is said to be in a loose coupling arrangement because the WLAN cell 420 is not directly connected to the 3G network as described below. In accordance with the description above, the mobile network is made up of a set of radio cells 402, and each cell 402 is controlled by one base station 408. RNC 404 controls a set of base stations 408. Wireless LAN 420 provides coverage within one of the cells 402. Within wireless LAN 420 an access point, or a collection of access points (not shown), provides the access network functions to provide connectivity to Internet 440. Also, within wireless LAN 420, inter-working unit 424 provides gateway functions that may correspond to an Internet gateway. Inter-working unity 424 is connected to Internet 440. CN edge device 428 couples RNC 404 to core network 426. The core network 426 is also connected to Internet 440 through CN edge device 427. The mobile terminal 430 may be connected to Internet 440 via 3G cell 402 or via WLAN cell 420 when the mobile terminal is inside WLAN cell 420.

The method for handing off the mobile terminal as it moves within a 3G terminal to a WLAN cell according to the present invention is now described with reference to FIG. 3. However, it is to be understood that the general strategy of waiting until all active calls are terminated before implementing the handoff is valid for either the loose coupling or tight coupling arrangements. The differences with regard to the re-attachment of the mobile terminals with the core network in the loose coupling and tight coupling arrangements are described further below.

Generally, when mobile terminal 330 moves from one 3G cell to another, a handoff occurs to disassociate mobile terminal 330 from the current 3G cell and associate mobile terminal 330 with the new 3G cell. The decision regarding the handoff is generally made and implemented by the RNC associated with the current 3G cell, based on factors such as, signal strength to mobile terminal 330, and capacity within the cells. For example, mobile terminal 330 may move into a coverage area of a new cell, but may remain associated with the current cell due to lack of capacity in the new cell. The handoff procedures are well known and may involve a complex protocol that transfer parameters and data between the RNCs to enable mobile terminal 330 to seamlessly transfer to the new 3G cell while active calls exist.

Regarding the combination of 3G cells and wireless LAN areas described above, it is desirable to provide a mechanism for handing off mobile terminal 330 as it moves from, or within, a 3G cell into a wireless LAN area, wherein the mechanism does not require a complex protocol for effecting the handoff, and reduces the potential for lost data during the handoff process. In that regard, the present invention proposes that for a mobile terminal that moves into a wireless LAN area from within a 3G cell, the handoff be effected when there are no existing active calls. According to the present invention, it is determined whether there are any ongoing calls. If not, the handoff occurs when the mobile terminal enters the coverage area of the wireless LAN, if so, the invention proposes to wait until the ongoing calls are terminated before initiating the handoff. The handoff comprises a process of disassociating from the current 3G cell and associating with the AP of the wireless LAN. By waiting until all of the ongoing calls are terminated, there is no need to provide a complex protocol that hands off mobile terminal 330 during a middle of a call to provide a seamless transfer from the point of view of the user. Since mobile terminal 330 remains within the coverage area of a 3G cell while mobile terminal 330 is in the coverage area of wireless LAN area 320, any ongoing calls are maintained so that there is no interruption in service, and there is no potential of an interruption in services during the call due to a fault during handoff.

In circuit switching communications, it is possible for mobile terminal 330 to have ongoing several circuit switch calls in parallel, although only one is dedicated for speech. Such calls are managed in UMTS/GSM through a multi-call supplementary service. In that case, the present handoff procedure may be initiated when all the calls are terminated, in other words, when all transport bearers (wireless radio and wire transport resources) are released.

In packet switching communications, the call is established through a PDP context activation procedure that occurs between the mobile station and the Public Data Network (PDN) gateway. In the case of UMTS, the PDN gateway corresponds to the GPRS Gateway Serving Node (GGSN). It is possible that a PDP context may be established even though the corresponding network resources have been released. For example, in the case of a PDP context that is established to allow a mobile terminal to access the internet, the network allocates resources (wireless and wired) called transport bearers along the path between the mobile terminal and the PDN gateway. After some time, if there is no activity on these transport bearers, the network may remove the transport bearers. In such a case, the PDP context exists, but there no longer is any network resources associated with the PDP context. In that case the present handoff procedure can start as soon as the transport bearers are removed. The mobile terminal or the network can determine whether there are any existing transport bearers associated for each PDP context, and initiate the present handoff procedure in response to this determination.

It is possible that a mobile terminal has both a circuit switch connection and a packet switch connection. In that case, the present handoff procedure is initiated after all bearers, radio and transport, have been released.

The signaling connection is a connection between the access layer entities. The non-access protocol layers comprise the protocol layers that are not directly involved in the transport of information. In UMTS, as well as GSM/GPRS, these layers are known as the call management (CM) layer and the mobility management (MM) layer.

The CM layer basically uses the signaling connection for call set up in the circuit switch domain and for PDP context activation in the packet switch domain. The MM layer uses the signaling connection for authentication, security and registration. Authentication and security procedures are performed each time the mobile terminal moves into a new registration area. A registration area is a set of cells. The mobile terminal knows the current registration area by listening to system information broadcast in the cell. The registration procedure also may be periodically performed in order to stay in contact with the network in the absence of activity. In the above-described configuration, the wireless LAN area is disposed within a 3G cell, and as such, the mobile terminal will be within a 3G cell when it detects a wireless LAN area. Thus, the present handoff procedure may be initiated as soon as the ongoing mobility management procedure is completed.

The signaling connection may exist although no mobility management procedure is being performed. In that case, either the mobile terminal or the network, depending on which entity is initiating the handoff, may release the signaling connection.

As noted above, the RRC is an entity that controls the radio resource allocation with the radio access network. According to the above, a handoff to a wireless LAN may be attempted if there are no bearers, radio or transport, associated with the mobile terminal. However, it is possible that the RRC may be involved in some type of procedure with respect to the radio access network. In another embodiment of the present invention, it is determined whether the RRC is involved with an ongoing radio resource control procedure. If so, the present invention waits until the ongoing procedure is terminated before initiating the handoff procedure.

The handoff may be initiated by RNC 304 or by mobile terminal 330 when a wireless LAN is detected and it is determined that there are no ongoing calls. To implement that handoff, mobile terminal 330 is disassociated from the 3G cell and is then associated with wireless LAN 320. By waiting until all ongoing calls have been terminated, the handoff may be accomplished by utilizing the relatively straightforward procedures for disassociating from the 3G cell and associating with the wireless LAN. These procedures are well known to those skilled in the art and are generally less complex to implement than the procedures for handing off mobile terminals during an ongoing call. Also, the potential that a fault during an ongoing call results in lost data is eliminated using the present method.

The present handoff procedure may be implemented as follows. In the first phase, all activities through the RNC are terminated and the mobile terminal is detached from the core network. In UMTS and GSM/GPRS environment, the mobile terminal sends a well specified DETACH command to the network. The second phase consists of re-attaching the mobile terminal to the core network through the wireless LAN, and its IWU, using the appropriate protocol. Depending on the inter-working strategy (loose coupling or tight coupling), the re-attachment is different. In the case of loose coupling, the IWU is an Internet gateway. The 3G cellular network and the WLAN interwork through the Internet. Consequently, re-attaching means that the mobile terminal is connected to the Internet through the WLAN.

Alternatively, in the case of tight coupling, the IWU acts as a RNC. The handoff procedure may be implemented by transferring the attachment from the RNC to the IWU through the core network. In UMTS/GSM environments, the IWU may be identified according to the 3G addressing scheme. In UTRAN, an RNC ID identifies a RNC, and a mobile terminal receives the RNC ID associated with a wireless LAN when the terminal moves into the wireless LAN. As noted above, the mobile terminal may initiate the handoff. In that case, the RRC associated with the mobile terminal sends a handoff request to receive the RNC ID of the IWU. The RNC then initiates the relocation procedure specified by UMTS or GSM.

The foregoing describes a method for implementing a handoff technique for a mobile terminal as the mobile terminal moves into a wireless LAN area within a 3G cell. Since the present handoff procedure waits until all active call are terminated before initiating handoff, the handoff occurs using well known procedures for disassociating from the 3G cell and associating with the wireless LAN. According to the present invention the handoff may be implemented without complex protocols to transfer various data and parameters associated with ongoing calls. The handoff according to the present invention also eliminates the potential for lost data associated with ongoing calls.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

We claim:

1. A method for controlling a mobile terminal, comprising the steps of:
    establishing an association with a first access network to connect to a core network;
    determining when the mobile terminal is entering a coverage area of a second access network, which is overlaid within the first access network;
    determining whether the mobile terminal has an active call session via the first access network when the mobile terminal enters the second access network, and if so, maintaining the association with the first access network when the mobile terminal enters the coverage area of the second access network until the active call session is terminated, and upon termination of the call session, disassociating from the first access network and establishing an association with the second access network to connect to the core network;
    wherein the first access network is a cellular network, and the second access network is a wireless local area network (LAN) cell.

2. The method according to claim 1, wherein the first access network is a third generation (3G) cell.

3. The method according to claim 2, wherein the 3G cell and the wireless LAN are coupled to the network in a loose coupling arrangement.

4. The method according to claim 3, further comprising the step of determining whether there is an ongoing mobility management procedure in progress when the mobile terminal enters the wireless LAN cell, and if so, maintaining the association with the first access network when the mobile terminal enters the coverage area of the second access network until the mobility management procedure is terminated.

5. The method according to claim 3, further comprising the step of determining whether there is an ongoing radio resource control procedure in progress when the mobile terminal enters the wireless LAN cell, and if so, maintaining the association with the first access network when the mobile terminal enters the coverage area of the second access network until the radio resource control procedure is terminated.

6. The method according to claim 3, wherein the step of disassociating from the first access network and associating with the second access network comprises receiving an radio network controller identifier (RNC ID) that corresponds to an access point in the wireless LAN cell.

7. The method according to claim 3, wherein the termination of the call session is determined in response to the presence of radio and transport bearers.

8. The method according to claim 3, wherein the association with the wireless LAN is established following a packet data protocol (PDP) context deactivation procedure between the mobile terminal and the first access network.

9. The method according to claim 3, wherein the association with the wireless LAN is established following deactivation of circuit switch connections.

10. The method according to claim 3, wherein the association with the wireless LAN is established following deactivation of packet switch connections.

11. The method according to claim 2, wherein the 3G cell and the wireless LAN are coupled to the network in a tight coupling arrangement.

12. The method according to claim 11, further comprising the step of determining whether there is an ongoing mobility management procedure in progress when the mobile terminal enters the wireless LAN cell, and if so, maintaining the association with the first access network when the mobile terminal enters the coverage area of the second access network until the mobility management procedure is terminated.

13. The method according to claim 11, further comprising the step of determining whether there is an ongoing radio resource control procedure in progress when the mobile terminal enters the wireless LAN cell, and if so, maintaining the association with the first access network when the mobile terminal enters the coverage area of the second access network until the radio resource control procedure is terminated.

14. The method according to claim 11, wherein the step of disassociating from the first access network and associating with the second access network comprises receiving an radio network controller identifier (RNC ID) that corresponds to an access point in the wireless LAN cell.

15. The method according to claim 11, wherein the termination of the call session is determined in response to the presence of radio and transport bearers.

16. The method according to claim 11, wherein the association with the wireless LAN is established following the PDP context deactivation procedure between the mobile terminal and the first access network.

17. The method according to claim 11, wherein the association with the wireless LAN is established following deactivation of circuit switch connections.

18. The method according to claim 11, wherein the association with the wireless LAN is established following deactivation of packet switch connections.

* * * * *